(12) United States Patent
Daudelin et al.

(10) Patent No.: US 6,314,532 B1
(45) Date of Patent: Nov. 6, 2001

(54) METHOD AND SYSTEM FOR RECOVERING FROM A SOFTWARE FAILURE

(75) Inventors: Douglas Streeter Daudelin, Lincoln Park; Harvey Rubin, Morristown, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/205,735

(22) Filed: Dec. 4, 1998

(51) Int. Cl.[7] .............................. G06F 11/00; G06F 11/36
(52) U.S. Cl. .................................. 714/38; 714/23
(58) Field of Search ..................... 714/38, 23, 2, 714/758, 502; 713/1, 2, 100; 340/825.06

(56) References Cited

U.S. PATENT DOCUMENTS 3,909,795 * 9/1975 Chang et al. .
4,237,533 * 12/1980 Mills et al. .
5,421,006 * 5/1995 Jablon et al. .
5,951,699 * 9/1999 Diez et al. .

* cited by examiner

Primary Examiner—Gopal C. Ray
(74) Attorney, Agent, or Firm—Brown Raysman Millstein Felder & Steiner LLP

(57) ABSTRACT

A method and system recover from a failure of an operational software program. A second software program which is known to function properly and is capable of downloading an updated copy of operational software is stored on the computer with the first software program. The second software program is a boot program which monitors resets of the first software program, determines if the number of resets which have occurred without the operational software first having reached a set operating point (such as establishing communication with a remote computer) reaches a threshold, and preempts operation of the first software program when the threshold is reached.

34 Claims, 5 Drawing Sheets

METHOD AND SYSTEM FOR RECOVERING FROM A SOFTWARE FAILURE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The invention disclosed herein relates generally to methods for recovering from software failures. More particularly, the invention relates to a method and system for replacing or correcting a program operating on a remotely located computerized device without the need to personally attend to the device.

BACKGROUND OF THE INVENTION

Due to bugs, operating environment problems, corruption of the stored software program, or other conditions, software programs frequently fail to perform their designated functions. When a program fails or crashes, it must frequently be replaced with an updated version or upgrade in which the bug is fixed, or the problem must otherwise be corrected in some fashion. This often requires a human operator to interact with the computer, either locally or remotely via a network or other communication link, to either correct the problem or replace the existing, faulty software program with the corrected upgrade.

However, if the portion of the program which is faulty affects the computer's basic input/output functions, the computer may be unable to accept commands from a human operator as needed to correct or replace the software. Further, if the faulty software affects the computer's ability to connect with a remotely located computer, the human operator at the remotely located computer may be unable to establish communications with the computer in order to correct or replace the faulty software. The operator would then be required to visit the computer to solve the problem.

This problem becomes pronounced in the context of communication system spread out over a large geographic area. For example, as shown in FIG. 1, a cellular wireless telecommunications system may contain a switching center 10 connected to local and long distance telephone offices, a number of base stations 12 connected to the switching center 10 and having transmitters and antennas and dispersed throughout a geographic area serviced by the system, and a number of wireless terminals 14 in wireless communication with the base stations 12. An operational software program operates the basic functions of each of the base stations 12.

If the operational software on any base station 12 is or becomes faulty, and the base station 12 fails to establish communications with the switching center 10, the operator at the switching center 10 will be unable to take any action remotely in an effort to repair or replace the base station software. In that event, the operator must personally visit the base station 12 to repair or replace the defective software. If the operational software is so faulty that the operator can not even locally interface with the base station 12 to perform basic input/output operations, more drastic measures, such as equipment or device replacement, may be needed to replace the faulty operational software in the base station 12.

The need to visit a failing base station 12 in the field places a substantial administrative burden on the system operator. This burden is exacerbated if a bug is prevalent in the copies of the operational software installed and running on all the base stations 12 in the system which prevents remotely upgrading the base station software to a new version. This event will require the operator to visit each and every station individually to repair or replace the software.

There is thus a need for a system to be able to recover from all failures of a software program from a distance, without the need to personally visit the failing computer.

SUMMARY OF THE INVENTION

It is an object of the invention to resolve the problems described above relating to repairing software failures in remotely located computerized devices.

It is another object of the invention to improve the reliability of operational software residing on a large number of computerized stations in a geographically widespread telecommunications system.

It is another object of the invention to recover from basic failures in operational software without the need to first install additional operating software.

The problems described above are overcome, in accordance with one embodiment of the invention, by storing and running on each remotely located computer on a network a software program which is known to be reliable and substantially free of bugs. The "known good" software tests the integrity of operational software residing on the remotely located computer, and decides whether to execute the operational software after each reset of the computer. The known good software monitors the number of resets of the operational software which occur without it ever having achieved a set or desired operating point, which may be predefined, such as establishing communications with a host computer. It may do this by storing a variable representing the number of resets and incrementing it each time a reset is performed, while that same variable is set to zero wherever the predefined operating point is achieved. If the variable reaches a limit or threshold, which may be predetermined, the known good software does not load the operational software at the next reset, but rather initiates a repair or replacement of the faulty operational software.

In a network or telecommunication system, the repair or replacement involves establishing communications with a host computer and transmitting a message of the error to the host. A human operator at the host computer can then attempt to remotely diagnose and repair the problem through the known good software. Alternatively, the host computer can automatically transmit an upgraded version of the operational software to replace the faulty version. The known good software receives the upgrade and overwrites the existing operational software.

In preferred embodiments, the known good software is a boot program which is loaded into memory every time the computer reboots. The known good software contains basic input/output functionality as well as routines for communicating with the host computer. Upon a reboot, the known good software tests the integrity of the operational software, such as by performing a cyclic redundancy check or checksum validation on the operational software file. If this validation test fails, the known good software establishes communications with the host computer to receive an upgrade. If the validation test passes, the operational software is executed and it is recorded whether or not a set operating point is reached.

BRIEF DESCRIPTION OF THE DRAWINGS

The invention is illustrated in the accompanying drawings which are meant to be exemplary and not limiting, in which.

DETAILED DESCRIPTION

Figure 1:
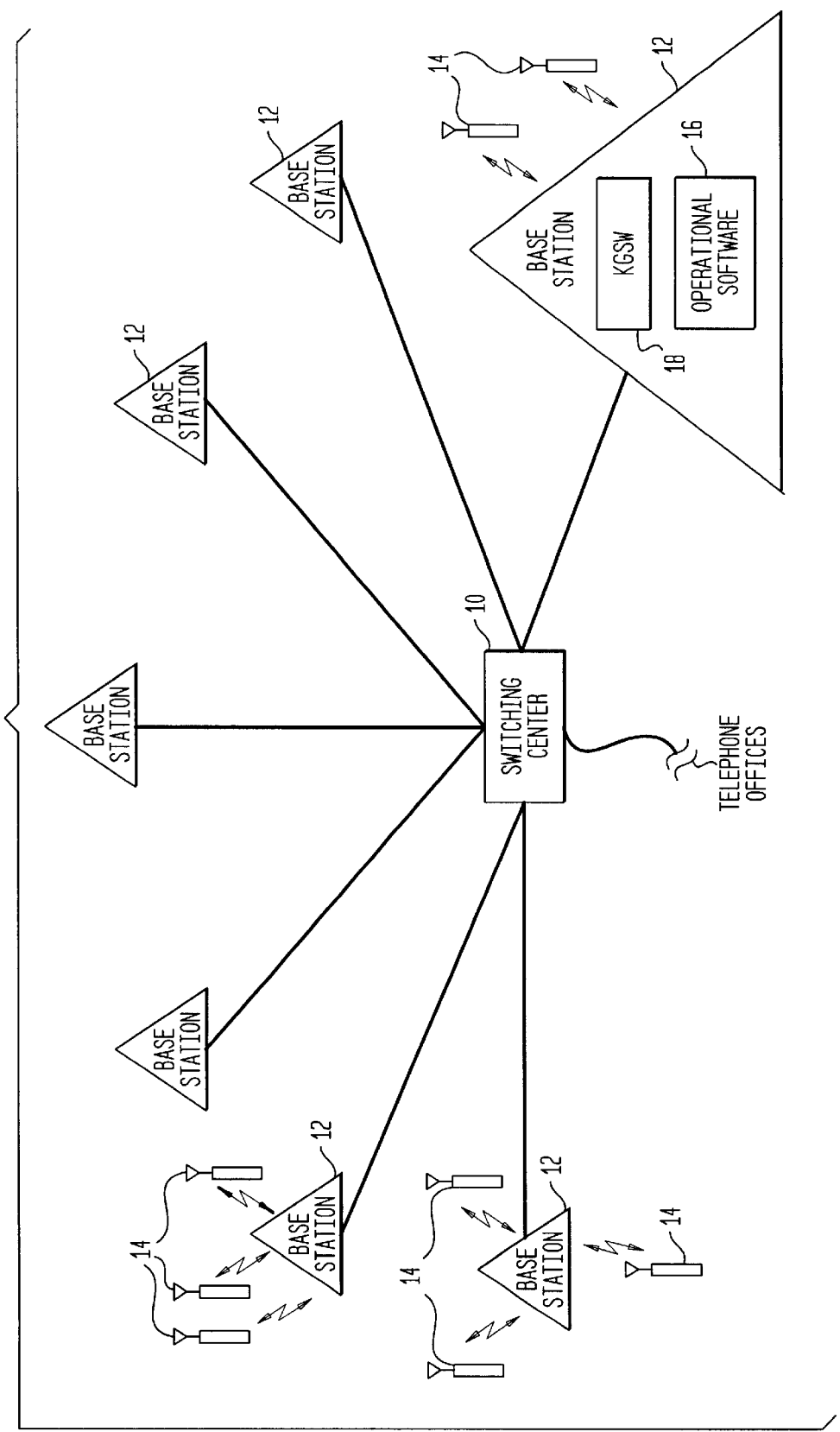
FIG. 1 is a system diagram showing a wireless telecommunication system employing the present invention.

The preferred embodiments of the present invention are now described with reference to the drawings in the figures. Referring to FIG. 1, a wireless telecommunication system of a preferred embodiment has a switching center 10, a number of base stations 12 interspersed throughout a geographic region, and wireless terminals 14, of which only a few are depicted in FIG. 1, in communication with each base station 12. As described in more detail below, the base stations 12, sometimes referred to as microcells, are computerized devices having the necessary hardware and software components to communicate with the switching center 10 and the wireless terminals 14.

In accordance with the invention, each base station 12 has operational software 16 for controlling the basic operation of the base station 12, and a software program 18 which is known to be substantially free of bugs and errors and to reliably perform its functions. In preferred embodiments, this software program 18, sometimes referred to herein as known good software or KGSW, is a boot program which is loaded and executed whenever the base station 12 is rebooted or reset, and which normally causes the operational software 16 to execute, except under certain conditions as explained further below. In addition, the known good software is capable of performing the basic input/output operations of the base station 12, including receiving input, displaying output, performing memory store and retrieval operations, and communicating with a host computer located at the switching center. Alternatively, the known good software 18 may be a well tested version of the operational software 16, such as a first or early version of the operational software 16, which, while being unable to perform all the functionality of the currently-installed version of the operational software 16, is known to be substantially reliable in the basic operations it is programmed to perform.

Figure 2:
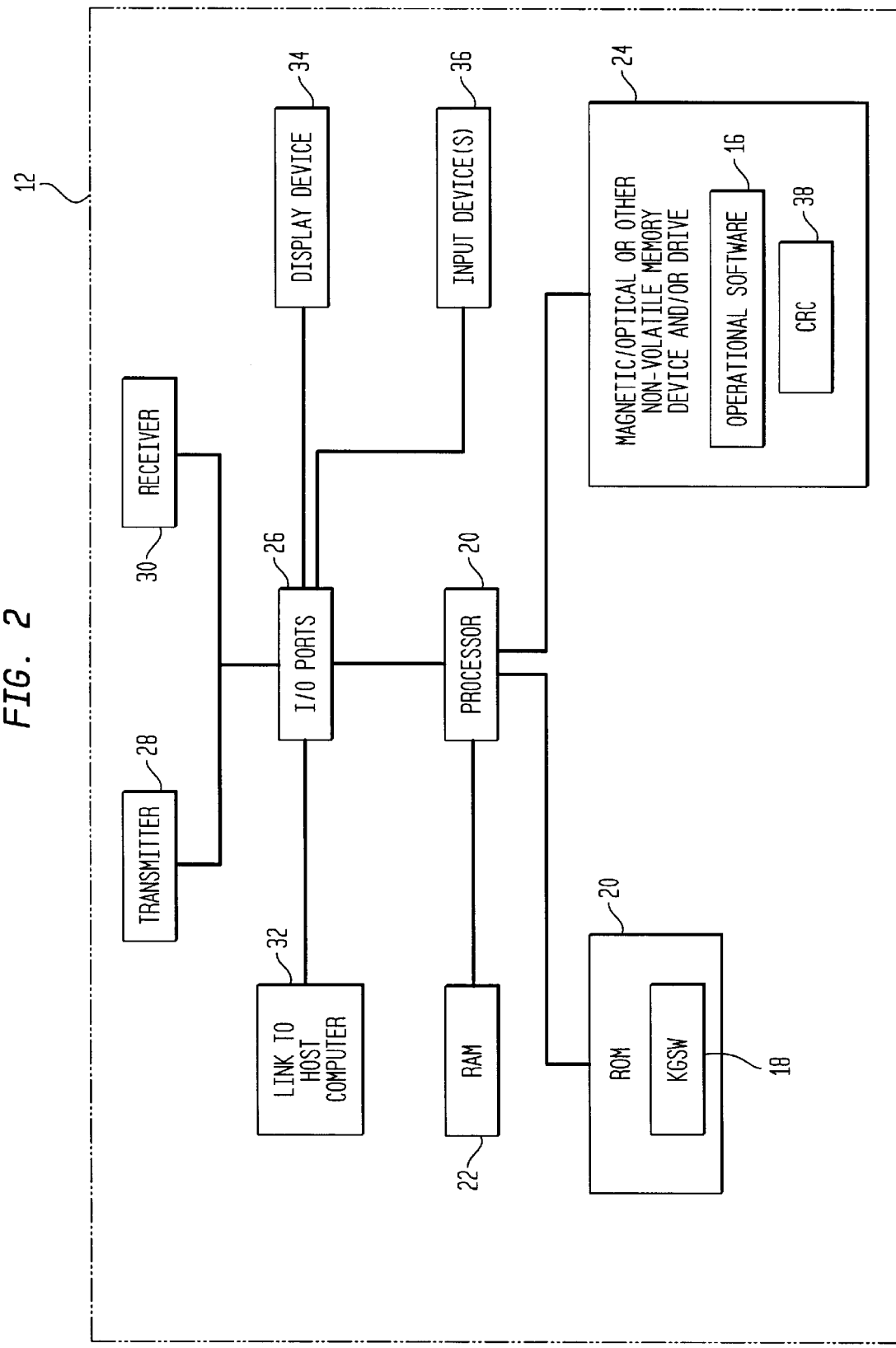
FIG. 2 is a block diagram of one embodiment of a base station of the wireless telecommunication system shown in FIG. 1.

As shown in FIG. 2, one embodiment of the base station 12 is a computerized device having a processor 20 which may be a conventional CPU of the type employed in personal computers, a microcontroller, or a specially programmed logic array as known to those of skill in the art. The base station 12 further contains a ROM device 22 such as an EEPROM coupled to the processor 20, a RAM device 22 coupled to the processor, and one or more magnetic or optical hard disks and disk drives 24 (or other non-volatile memory devices) also coupled to the processor 20. The base station 12 contains input/output ports 26 coupled to the processor, and a number of input/output devices coupled to the ports 26, including a wireless transmitter 28, wireless receiver or antenna 30, a link 32 connecting the base station 12 to the host computer at the switching center 10, and, if desired, a display device 34 and input device 36.

In some embodiments, the executable file for the operational software 16 is stored on the hard disk 24 and loaded into RAM 22 prior to execution. Also stored on the hard disk 24 is a number representing a checksum of the operational software 16, such as a cyclic redundancy check (CRC) 38 of the operational software 16. The known good software 18 is stored in ROM 20 so as to be loaded into RAM 22 and executed upon a reboot of the base station 12. One skilled in the art will recognize that the KGSW 18, operational software 16, and CRC 38 may each be stored on other nonvolatile memory devices.

Figure 3A:
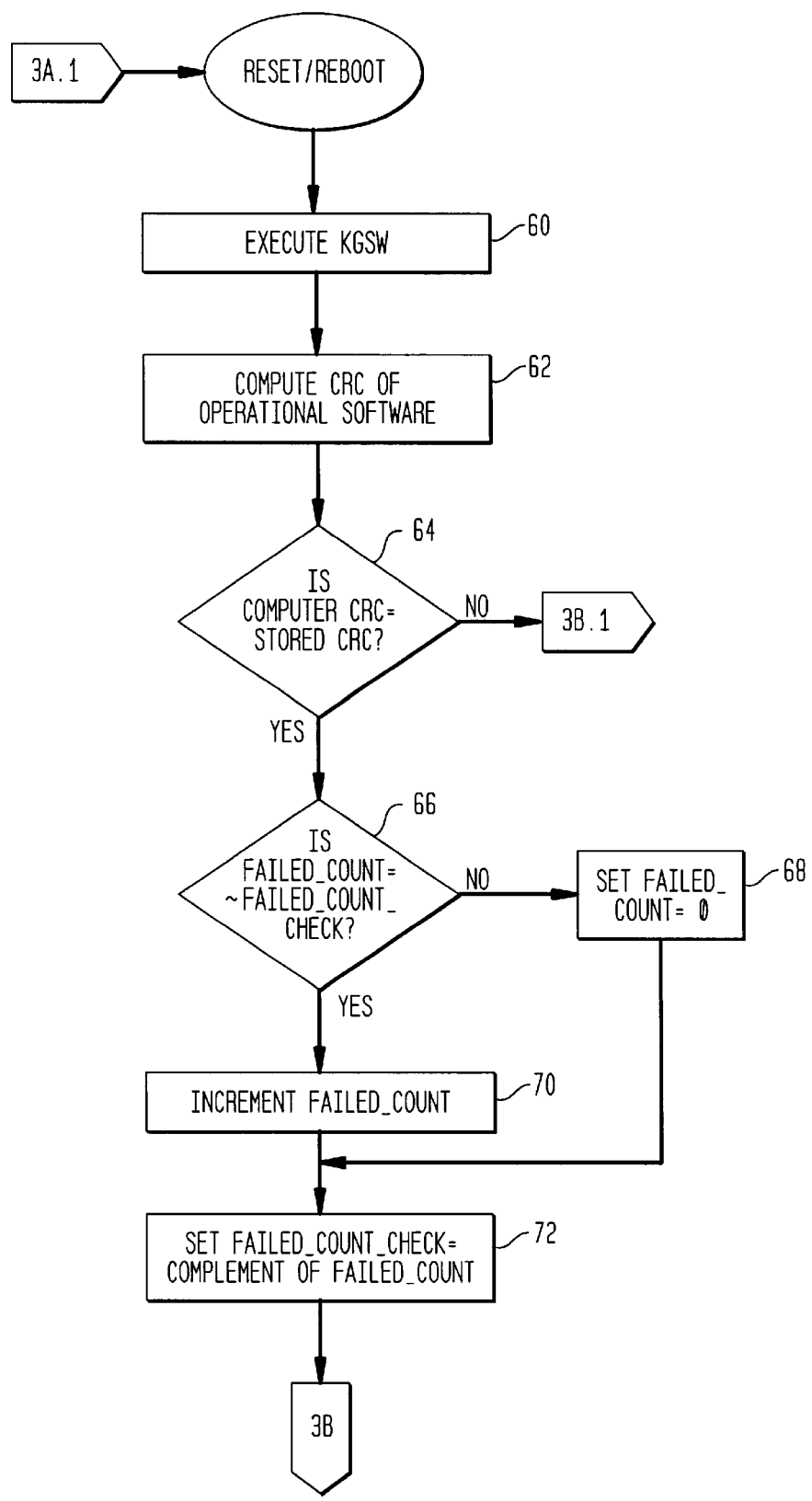
FIGS. 3A–3B contain a flow chart showing the process of recovering from a software failure in accordance with one preferred embodiment of the present invention.
Figure 3B:
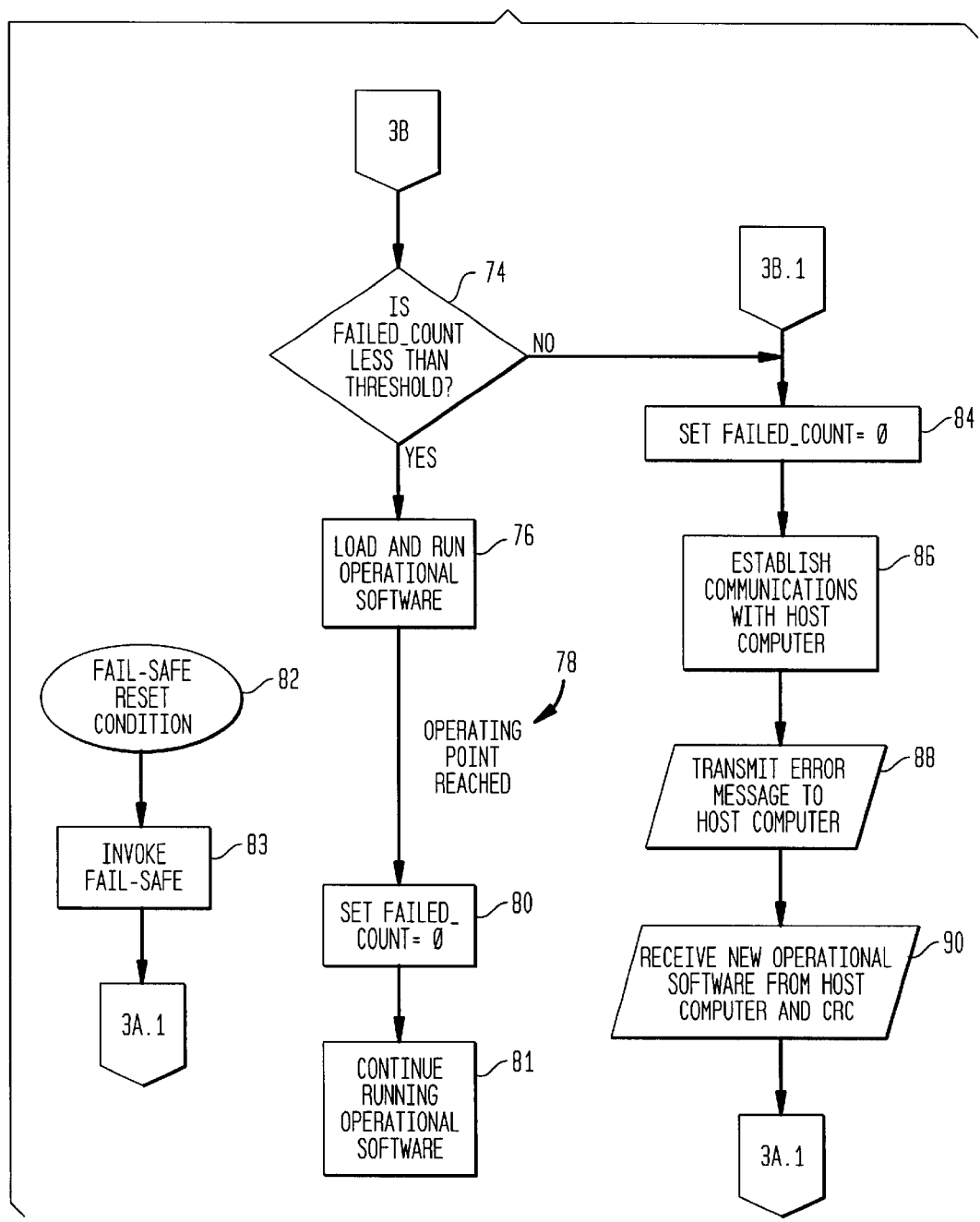

In accordance with the present invention, the KGSW 18 is employed to help detect and resolve problems arising with the operational software 16 or to receive and install a replacement version or upgrade of the operational software 16 on the base station 12. The process performed by the KGSW in accordance with one preferred embodiment is now described with reference to FIGS. 3A–3B.

A base station 12 has the KGSW 18 installed therein and operational software 16 installed in, formatted and initialized for the base station 12. The base station 12 reboots and executes the KGSW boot program, step 60. A failed_count variable, used to count the number of times the base station 12 reboots, as described further below, has been initialized to zero and stored in nonvolatile memory. The failed_count variable may also be stored in RAM. A failed_count_check variable, used to check the integrity of the failed_count variable, has been previously set equal to the bit-wise complement of the failed_count variable.

To validate or check the integrity of the operational software, the KGSW computes a CRC or other checksum of the operational software executable file or files stored in base station memory, step 62. This computed checksum is compared to the checksum 38 stored in memory, step 64, to determine whether the operational software files have become corrupted. If the checksums are not equal, the KGSW initiates a repair procedure described below in reference to FIG. 3B. One skilled in the art will recognize that other validations or integrity tests may be employed.

If the CRCs are equal, the KGSW 18 tests the integrity of the failed_count variable retrieved from memory by comparing it to a bit-wise complement of the failed_count_ check variable retrieved from memory, step 66. If both variables have maintained their integrity, the failed_count variable should be equal to a complement of the failed_ count_check variable. A failure of integrity of the two variables may have resulted from a power glitch or other operating environment problem. If the condition is not satisfied, the failed_count variable is initialized to zero, step 68, and the failed_count_check variable is initialized to the complement of the failed_count variable, step 72. If the condition is satisfied, indicating that the two variables have likely maintained their integrity, the failed_count variable is incremented by one, step 70, to reflect that the KGSW has been rebooted once, and the failed_count_check is set equal to the complement of the value of the failed_count variable, step 72. One skilled in the art will recognize that the steps involved in validating the failed_court variable are not critical and may be omitted, because corruption of the variable results only in unnecessary resets of the base station and, depending upon the reaction of the host computer as explained below, potentially an unnecessary download of new operational software.

As the KGSW reboots in response to failures, the failed_ count variable continues to increment to count the number of reboots and thus the number of failures. The value of the failed_count variable is compared to the threshold, step 74, to determine whether the number of failures has reached the critical, possibly predetermined value at which action must be taken. If the number of failures is less than the threshold, the operational software is loaded into memory and executed, step 76. The KGSW, or the operational software itself or some other mechanism monitors execution of the operational software to determine whether the operational software achieves a set or predefined operating point (condition 78). This operating point may be any desired goal. Examples include establishing communications with the host computer within a given amount of time, receiving a message from the host computer indicating the operational software is acceptable, operating without failure for a given amount of time, operating until a "normal reset" command has been received from the host computer (that is, all "abnormal resets" will be counted as never having reached the operating point), processing a given number of calls without failure, or a combination of some or all of these and other conditions. The framework of using the failed_count variable in accordance with the present invention is applicable to any system whose characteristics allow it to be included in the solution domain and enable recovery based upon system-specific criteria.

If the operational software 16 achieves the set operating point, the failed_count variable is reinitialized to zero, step 80, and the operational software continues functioning normally in step 81 until the base station 12 is reset. As described further below, the base station 12 may be reset externally by command from the host computer even when the operational software is functioning normally.

If the operational software fails to achieve the predefined operating point, a fail-safe reset mechanism is able to be invoked (either manually or automatically), steps 82–83, which causes the KGSW to repeat the steps performed at reboot; including checking the integrity of the operational software, checking the integrity of the failed_count variable, incrementing the failed_count variable, comparing the failed_count variable to the threshold, and executing the operational software. A fail-safe reset mechanism is one which not only causes resets under normally directed conditions, but also under failure conditions. An example of such a mechanism, as processing means, is the provision of a hardware sanity timer which is satisfied only when properly operating software receives regular commands from a host computer. The hardware sanity timer will expire, causing a reset of the system, if: a) the host computer sends a command to properly operating software directing that the sanity timer should be permitted to expire, or b) regular commands are not received from the host computer directing the operating software to reset the sanity timer, or c) the operational software is defective, and not able to keep the hardware sanity timer from expiring and resetting the computer. One skilled in the art will recognize that there are other mechanisms of implementing a fail-safe reset mechanism.

If the KGSW reboots enough times, the threshold will eventually be reached. In that event, the failed_count variable is reset to zero, step 84, the KGSW establishes a communications link with the remotely located host computer, step 86, and transmits an error message to the host computer, step 88. In some embodiments, the host computer automatically transmits new operational software which is received by the base station 12, step 90, and installed by the KGSW. This new operational software is then tested in accordance with the procedures set forth above.

Alternatively, a human operator may interact remotely with the base station via the KGSW to diagnose and repair the problem with the operational software, e.g., by modifying a setting in the operational software, or supplying, renaming or moving a file. For example, if the operational software 16 employs a library file which it expects to be contained in a given directory but which is not contained there, the remotely located operator can change the directory setting in the operational software, can move the library file, or can supply another copy of the file. The human operator can check whether the KGSW is running because of the operational software CRC check failing, or the failed_count variable reaching its threshold, and take the corresponding appropriate actions to correct the problem.

Figure 4:
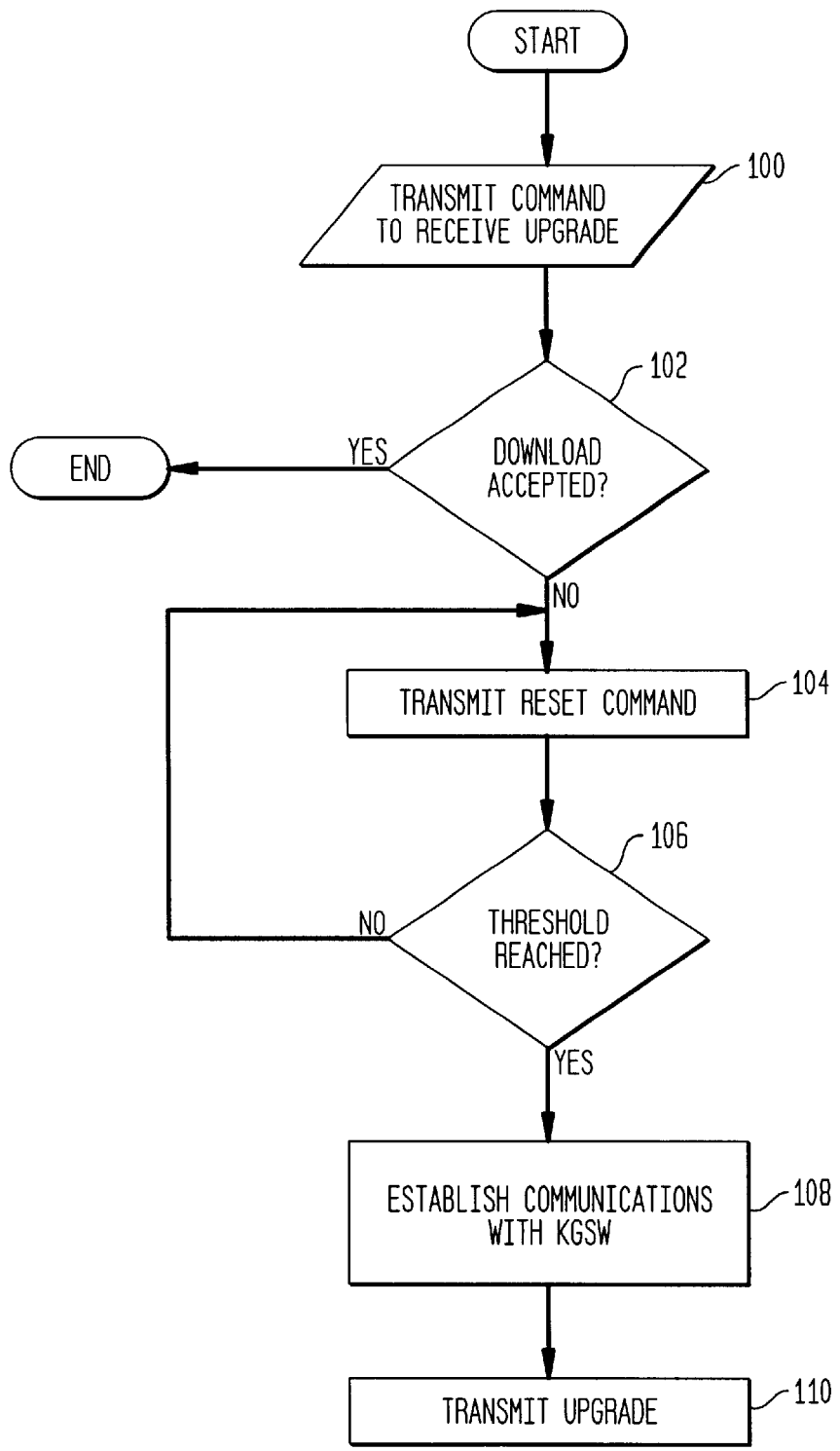
FIG. 4 is a flow chart showing the process of upgrading operational software on a remote computer from a host computer in accordance with one preferred embodiment of the present invention.

The present invention may advantageously be employed to remotely provide, install, and test upgraded or corrected versions of operational software on a number of base stations from the host computer. With reference to FIG. 4, in one preferred embodiment, the host computer transmits a command to a given base station to receive the upgrade, step 100. If the operational software in the base station is functioning correctly, it should accept the downloaded upgrade and install it on the base station, step 102. If the download is not accepted, the host computer invokes a reset of the base station, step 104. After waiting sufficient time for the reset to occur and the operational software to be tested and executed by the KGSW, the host computer may again attempt to transmit the upgrade.

Alternatively, on the assumption that a failure to accept the download indicates a defect in the currently executing operational software, the host computer invokes consecutive fail_safe resets of a sufficient number to reach the threshold of the failed_count variable, step 106. After each reset, the base station resets onto the corrupted copy of the operational software, assuming that the CRC is valid. Once the threshold is reached, the known good software remains executing and effectively assumes control of the base station in accordance with the procedure described above. At this point the remotely located operator will try to analyze the problem through the KGSW and direct the KGSW to receive a corrected copy of the operational software. To do this, the host computer establishes communications with the KGSW, step 108. Once communications are successfully established, the host computer transmits the upgraded operational software, step 110, which can then be installed on the base station as explained above.

While the invention has been described and illustrated in connection with preferred embodiments, many variations and modifications as will be recognized by those skilled in this art may be made without departing from the spirit and scope of the invention. For example, one skilled in the art will recognize that other mechanisms may be used to monitor or track the repeated failure of the operational software to achieve a predefined operating point, such as storing a variable representing a total amount of time passed or operations performed since a reboot to achieve the predefined operating point. The invention is thus not to be limited to the precise details of methodology or construction set forth above as such variations and modification are intended to be included within the scope of the invention.

What is claimed is:

1. A method for recovering from a failure of a first software program, the method comprising:

resetting the first software program when a set operating point is not reached;

monitoring the number of resets of the first software program invoked without reaching the set operating point; and if the number of resets reaches a threshold, preempting operation of the first software program and operating a second software program to thereby correct the failure or replace the first software program.

2. The method of claim 1, wherein the step of monitoring comprises counting the number of resets of the first software program invoked without reaching the set operating point.

3. The method of claim 2, wherein the step of counting comprises storing a variable representing the number of consecutive resets invoked without reaching the set operating point.

4. The method of claim 3, comprising incrementing the variable at each reset, and setting the variable to zero when the software program achieves the set operating point.

5. The method of claim 3, wherein the step of storing comprises storing the variable in a non-volatile memory device.

6. The method of claim 3, comprising validating the variable before preempting operation of the first software program.

7. The method of claim 6, wherein the step of validating comprises:
    complementing the variable after the variable is incremented to produce a first complement;
    storing the first complement; and
    after a reset of the first software program, retrieving the variable and stored first complement, complementing the variable to produce a second complement, and comparing the first complement to the second complement.

8. The method of claim 2, wherein the step of monitoring comprises counting the number of consecutive resets of the first software program.

9. The method of claim 1, comprising storing the second software program in a non-volatile memory device.

10. The method of claim 1, comprising executing the second software program upon each reset, the second software program causing the first software program to execute.

11. The method of claim 10, comprising validating the first software program before causing the first software program to execute, a failure to validate the first software program being a failure of the first software program to achieve a predefined operating point.

12. The method of claim 11, wherein the step of validating comprises computing a checksum of the first software program and comparing the computed checksum with a stored checksum.

13. The method of claim 10, wherein the second software program is a boot program, and wherein the step of resetting comprises rebooting.

14. The method of claim 1, wherein the first and second software programs reside on a first computerized device which is coupled via a communication link with a remotely located host computerized device.

15. The method of claim 14, comprising the second software program transmitting a message to the host computerized device when the number of resets of the first software program reaches the threshold.

16. The method of claim 15, comprising transmitting from the host computerized device to the first computerized device an upgrade program to replace the first software program.

17. The method of claim 14, comprising transmitting from the host computerized device to the first computerized device one or more commands to reset the first software program one or more times.

18. The method of claim 17, comprising transmitting reset commands from the host computerized device until the number of resets of the first software program reaches the threshold, thereby causing the second software program to operate.

19. The method of claim 14, comprising resetting the first software program at least once when it fails to establish communications with the host computerized device.

20. The method of claim 1, comprising pre-defining the set operating point.

21. A system for recovering from a failure of a first software program operating on a computerized device, the system comprising:
    processing means for executing the first software program and resetting the first software program at least once when the first software program fails to reach a set operating point;
    nonvolatile memory for storing a second software program which when executed monitors the resets of the first software program caused by the first software program failing to reach the set operating point, determines whether the number of resets reaches a predetermined threshold, and preempts operation of the first software program when the predetermined threshold is reached; and
    means for correcting the failure of the first software program or replacing the first software program when the threshold is reached.

22. The system of claim 21, wherein the computerized device is coupled via a communications link with a remotely located host computerized device.

23. The system of claim 22, wherein the processing means comprises means for resetting the first software program when the computerized device fails to establish communications with the host computerized device.

24. The system of claim 22, comprising means for transmitting a message from the computerized device to the host computerized device when the number of resets of the first software program reaches the threshold.

25. The system of claim 22, comprising means for transmitting from the host computerized device to the computerized device an upgrade program to replace the first software program.

26. The system of claim 22, comprising means for transmitting one or more reset commands from the host computerized device to the computerized device until the number of resets of the first software program reaches the threshold, thereby causing the second software program to operate.

27. The system of claim 21, wherein the second software program monitors by storing in nonvolatile memory a variable representing the number of resets of the first software program and incrementing the variable at each reset.

28. A system comprising:
    a first computerized device;
    a host computerized device coupled via a communication link to the first computerized device;
    an operational software program residing on the first computerized device for operating the first computerized device; and
    a second software program residing on the first computerized device for resetting the first computerized device when the operational software program fails to achieve a set operating point, counting the number of resets of the operational software program, and when the number of resets reaches a threshold, preempting operation of the operational software program and transmitting a message to the host computerized device.

29. A method performed by a boot software program for recovering from a failure of an operational software program operating on a computerized device to achieve a predefined operating point, the computerized device being coupled to a host computerized device, the method comprising:

rebooting the computerized device when the operational software program fails;

executing the operational software program after a reboot;

storing in a nonvolatile memory in the first computerized device a variable representing the number of reboots of the operational software program;

incrementing the variable at each reboot; and if the number of reboots reaches a threshold, preempting operation of the operational software program and transmitting a message to the host computerized device.

30. The system of claim 29, wherein the step of rebooting the computerized device comprises rebooting when the operational software program fails to establish communications with the host computerized device.

31. The system of claim 29, comprising receiving one or more reset commands from the host computerized device and rebooting the computerized device at each reset command until the number of reboots reaches the threshold.

32. The system of claim 29, comprising replacing the operational software program with a replacement operational software program received from the host computerized device.

33. The system of claim 29, comprising validating the operational software program before executing the operational software program.

34. A computer readable medium storing one or more programs which when executed on a computerized device implement a method for recovering from a failure of a first software program, the method comprising:

resetting the first software program when a set operating point is not reached;

monitoring the number of resets of the first software program invoked without reaching the set operating point; and if the number of resets reaches a threshold, preempting operation of the first software program and operating a second software program to thereby correct the failure or replace the first software program.

* * * * *